Nov. 11, 1930.  A. SPENCER  1,781,253
RAILWAY AND THE LIKE VEHICLE
Filed Oct. 22, 1929
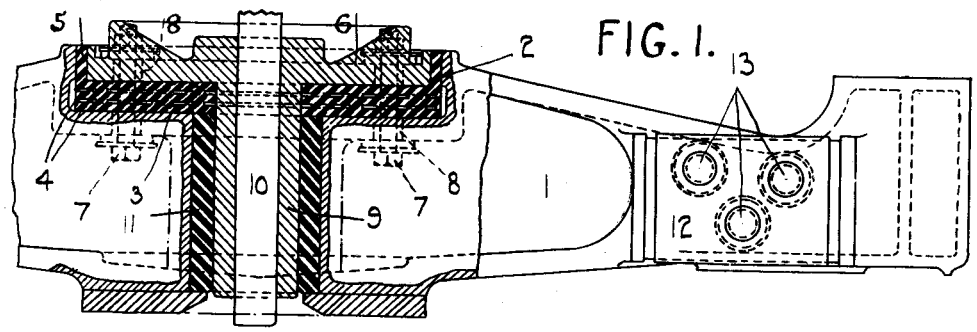
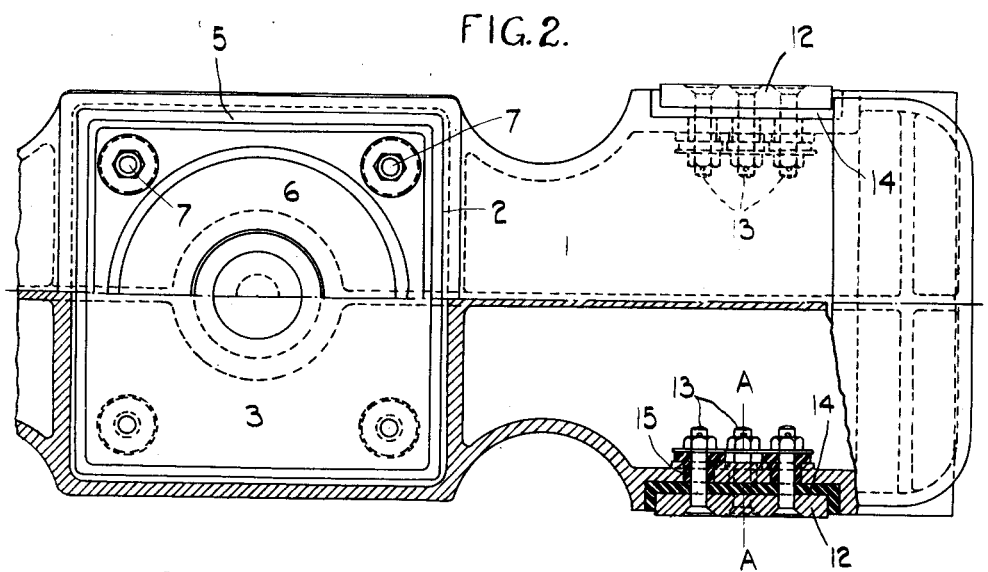
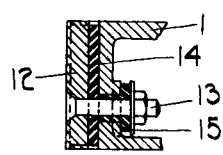
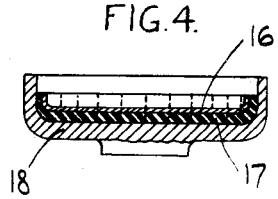
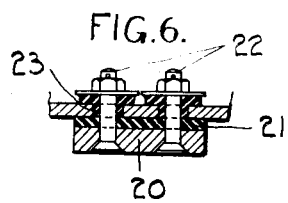
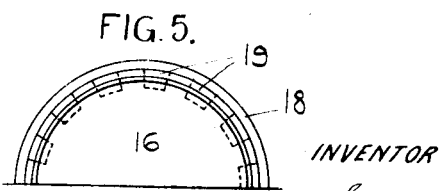
INVENTOR
Alexander Spencer
BY
Herbert W. Jenner
ATTORNEY Patented Nov. 11, 1930

1,781,253

UNITED STATES PATENT OFFICE

ALEXANDER SPENCER, OF LONDON, ENGLAND

RAILWAY AND THE LIKE VEHICLE

Application filed October 22, 1929, Serial No. 401,518, and in Great Britain October 4, 1929.

This invention relates to railway and the like vehicles in which the vehicle body is supported on a bolster that rests on springs carried by the spring plank of a bogie truck.

The object of the invention is to provide improved constructions and arrangements of vibration absorbing bodies of india-rubber at parts subjected to shock due to relative movement and generally at such points and in such a way as to absorb vibration, deaden noise, give smooth running, and avoid detrimental stresses.

According to the invention an adequate pad of india-rubber is located between the spring supported bolster and the centre plate or casting and the downwardly extending tubular stem of said centre plate or casting through which the king bolt extends is fitted externally with a vibration absorbing sleeve of india-rubber.

The side rubbing plates of the spring supported bolster are seated in appropriately shaped pads of india-rubber and the side bearing plates or rollers secured to the underframe of the vehicle body and which work on the said bolster are also mounted on pads of india-rubber.

Furthermore, according to the invention the springs that support the bolster are seated in cups that are backed by pads of india-rubber, and the bolts that connect the centre plate or casting to the bolster, the bolts that connect the side rubbing plates to the bolster, and the bolts that connect the side bearing plates to the vehicle body underframe, are all insulated by sleeves and washers of india-rubber so that metal to metal contact is avoided.

The india-rubber pads are so formed or mounted as to be capable of expansion and whilst simple pads of india-rubber may be employed it is preferable to make such pads in the form of moulded bodies of india-rubber having flanges that extend around the metal members seated thereon.

In all cases the pads or bodies of india-rubber are of ample thickness and of sufficient area as to absorb and cushion efficiently the shocks and vibratory movements which occur when running and thereby prevent such shocks being transmitted to the vehicle bodies.

Figs. 1 and 2 of the accompanying drawing show in sectional elevation and sectional plan, respectively, as much of a bogie bolster as is necessary to illustrate the invention.

Fig. 3 is a section corresponding to the line A—A of Fig. 2.

Fig. 4 shows in central section and Fig. 5 in half plan, one of the seats for the springs supporting the bolster.

Fig. 6 is a sectional view of one of the side bearing plates adapted to rest on the bolster.

The spring-supported bolster 1 of the bogie is formed at the centre of its upper face with a rectangular or other shaped recess 2 in which is placed an india-rubber pad consisting of a body 3 of india-rubber in which is or are moulded a perforated metal plate or two or more perforated metal plates 4 arranged one above the other. A marginal flange 5 of india-rubber extends upwardly from said pad 3 and within the cup or pocket formed by the marginal flange the centre plate or casting 6 is placed with its base resting on the india-rubber pad. The marginal flange 5 fits the rectangular or other shaped recess 2 of the bolster and forms a cushion that surrounds the centre plate or casting 6. The lower part of the recess 2 in the bolster in line with the pad 3 of india-rubber is larger than the said pad so that space is provided for expansion of the india-rubber pad. If desired, in order to facilitate assembly the recess formed by the said marginal india-rubber flange 5 may be flared upwardly and the edge of the centre plate or casting 6 may be correspondingly tapered in order to enter the said recess easily. Bolts 7 that extend through the centre plate or casting 6 and through the india-rubber pad 3 connect the said plate or casting to the bolster and said bolts where they pass through the centre plate or casting and through the web of the bolster are furnished with flanged sleeves 8 of india-rubber, the flanges of said sleeves being located between washers on the bolts and the metal of the centre plate or casting and bolster.

The downwardly extending tubular stem 9 of the centre plate or casting 6 through which the king bolt 10 passes, extends through a hole formed therefor in the bolster and surrounding the said stem is an india-rubber sleeve 11 that constitutes a vibration absorbing lining to the hole in the bolster. In order to allow for the india-rubber of which the sleeve is formed to expand the external periphery of the said sleeve may be formed with recesses or recessed panels.

The rubbing plates 12 which are fixed to the sides of the bolster by suitable bolts 13, each rests in a recess formed therefor in a block of india-rubber 14 that is fitted in a recess in the side of the bolster. The fixing bolts 13 for said rubbing plates 12 are fitted with flanged sleeves 15 of india-rubber where they pass through the metal side wall of the bolster.

Springs, generally nests of helical steel springs, support the bolster 1 near each end and each end of each spring or nest of springs rests in a pressed metal cup or seating 16, Figs. 4 and 5, that is bedded in a cup-like body 17 of india-rubber mounted in a holder 18 carried by the spring plank or mounted on the underside of the bolster, respectively. Preferably the said india-rubber cup-like bodies are formed with peripheral notches 19 in order to allow room for expansion of the india-rubber under load.

The side bearing blocks 20, Fig. 6, fixed to the vehicle body and resting on the bolster are also bedded on pads 21 of india-rubber and the bolts 22 that fix them in place are furnished with flanged sleeves 23 of india-rubber.

It will be understood that the invention is not restricted to constructive details as obvious modifications may be made without departure from the invention.

What I claim is:—

1. In a railway vehicle bogie truck, a bolster, a centre casting, and a shock absorbing pad of india-rubber on which said centre casting is seated, the said india-rubber block having an upstanding flange extending around the base of said centre casting.

2. In a railway vehicle bogie truck, a bolster formed with a central recess on its upper side, an india-rubber pad within the recess of said bolster, a flange on said pad that lines the wall of said bolster recess, and a centre casting resting on said india-rubber pad.

3. In a railway vehicle bogie truck, a bolster, a centre casting, a shock absorbing pad of india-rubber on which said centre casting is seated, the said india-rubber block having an upstanding flange extending around the base of said centre casting, bolts for securing said centre casting to said bolster, and india-rubber sleeves surrounding said bolts.

4. In a railway vehicle bogie truck, a bolster, a centre casting, a shock absorbing pad of india-rubber on which said centre casting is seated, the said india-rubber block having an upstanding flange extending around the base of said centre casting, bolts for securing said centre casting to said bolster, and flanged india-rubber sleeves surrounding said bolts.

5. In a railway vehicle bogie truck, a bolster, a centre casting having a tubular stem that passes through said bolster, a shock absorbing pad of india-rubber on which said centre casting is seated, the said india-rubber block having an upstanding flange extending around the base of said centre casting, and an india-rubber sleeve surrounding the tubular stem of said centre casting.

6. In a railway vehicle bogie truck, a bolster, a centre casting, a pad of india-rubber on which said centre casting is seated, side rubbing plates secured to said bolster, and an india-rubber pad on which said side rubbing plates are seated said india-rubber pad having flanges that embrace said side plates.

7. In a railway vehicle bogie truck, a bolster, a centre casting, a pad of india-rubber on which said centre casting is seated, side rubbing plates, bolts that secure said side rubbing plates to said bolster, india-rubber sleeves surrounding said bolts, and an india-rubber pad on which said side rubbing plates are seated said india-rubber pad having flanges that embraces said side plates.

8. In a railway vehicle bogie truck, a bolster, a centre casting, a pad of india-rubber on which said centre casting is seated, side rubbing plates, bolts that secure said side rubbing plates to said bolster, flanged india-rubber sleeves surrounding said bolts, and an india-rubber pad on which said side rubbing plates are seated said india-rubber pad having flanges that embrace said side plates.

9. In a railway vehicle bogie truck, a bolster formed with a central recess on its upper face the said recess being enlarged at the lower part thereof, an india-rubber pad within the said recess in a position such that the india-rubber thereof can expand into the enlargement of said recess, and a centre casting resting on said india-rubber pad.

In testimony whereof I affix my signature.

ALEXANDER SPENCER.